United States Patent [19]

Fu et al.

[11] Patent Number: 4,935,121

[45] Date of Patent: Jun. 19, 1990

[54] REACTIVATION OF METAL-CONTAMINATED CRACKING CATALYSTS

[75] Inventors: Chia-Min Fu; Michael K. Maholland, both of Bartlesville; Richard E. Lowery, Tulsa, all of Okla.

[73] Assignee: Phillips Petroleum Company, Bartlesville, Okla.

[21] Appl. No.: 370,670

[22] Filed: Jun. 22, 1989

[51] Int. Cl.$^5$ .................. C10G 11/05; B01J 38/66
[52] U.S. Cl. .................. 208/120; 208/52 CT; 208/111; 502/26; 502/27; 502/36; 502/521
[58] Field of Search ............ 208/52 CT, 120; 502/36, 502/26, 27, 521

[56] References Cited

U.S. PATENT DOCUMENTS

| | | | |
|---|---|---|---|
| 2,331,473 | 10/1943 | Hyman | 208/52 CT |
| 2,618,613 | 11/1952 | Kimberlin, Jr. | 208/52 CT |
| 2,643,971 | 6/1953 | Lien et al. | 208/52 CT |
| 2,651,599 | 9/1953 | Watts et al. | 208/52 CT |
| 2,673,187 | 3/1954 | Stine | 208/52 CT |
| 2,681,305 | 6/1954 | Sweetser | 208/52 CT |
| 3,364,151 | 1/1968 | Disegna et al. | 252/441 |
| 3,711,422 | 1/1973 | Johnson et al. | 252/414 |
| 3,933,983 | 1/1976 | Elliott, Jr. | 423/328 |
| 4,025,458 | 5/1977 | McKay | 252/416 |
| 4,111,845 | 9/1978 | McKay | 252/455 Z |
| 4,158,621 | 6/1979 | Swift et al. | 208/114 |
| 4,289,608 | 9/1981 | McArthur | 208/121 |
| 4,321,128 | 3/1982 | Yoo | 208/114 |
| 4,337,144 | 6/1982 | Yoo | 208/120 |
| 4,377,470 | 3/1983 | Hettinger, Jr. et al. | 208/120 |
| 4,424,116 | 6/1983 | Hettinger, Jr. | 208/120 |
| 4,473,463 | 9/1984 | Bertus et al. | 208/120 |
| 4,500,422 | 2/1985 | Miale et al. | 208/117 |
| 4,549,958 | 10/1985 | Beck et al. | 208/253 |
| 4,551,231 | 11/1985 | Kovach et al. | 208/52 CT |
| 4,556,749 | 12/1985 | Hazbun | 585/330 |
| 4,559,131 | 12/1985 | Miale | 208/111 |
| 4,596,704 | 6/1986 | Miale et al. | 423/328 |
| 4,728,629 | 3/1988 | Bertus et al. | 502/62 |
| 4,794,095 | 12/1988 | Walker et al. | 502/64 |
| 4,800,185 | 1/1989 | Elvin et al. | 208/52 CT |
| 4,814,066 | 3/1989 | Fu | 208/120 |

FOREIGN PATENT DOCUMENTS 0295019 12/1988 European Pat. Off. .
0295020 12/1988 European Pat. Off. .

OTHER PUBLICATIONS

"Petroleum Refining", James K. Gary and Glenn E. Handwerk, Jan. 1975, Marcel Dekker, Inc., pp. 86–95, 101, 110 and 111.

Primary Examiner—Helane Myers
Attorney, Agent, or Firm—K. K. Brandes

[57] ABSTRACT

A process for reactivating a spent, metal-contaminated zeolite-containing cracking catalyst composition comprises the substantially simultaneous contacting with a fluorine compound (preferably $NH_4F$) and a metals passivating agent (preferably a compound of Sb or Ca). The thus reactivated cracking catalyst composition is employed in a catalytic cracking process.

40 Claims, No Drawings

REACTIVATION OF METAL-CONTAMINATED CRACKING CATALYSTS

BACKGROUND OF THE INVENTION

This invention relates to a method of reactivating spent, metal-contaminated zeolite-containing catalytic cracking catalysts. In another aspect, this invention relates to a reactivated cracking catalyst. In still aspect, this invention relates to a catalytic cracking process employing a reactivated spent, metal-contaminated cracking catalyst.

Methods of rejuvenating deactivated zeolite-containing cracking catalysts by treatment with fluorine compounds are known and have been disclosed in the patent literature, e.g., in U.S. Pat. Nos. 4,814,066, 4,559,131 and 4,500,422. Also, the use of so-called passivating agents for alleviating the detrimental effects of metal contaminants on cracking catalysts has been described in the patent literature, e.g., in U.S. Pat. Nos. 3,711,422, 4,337,144 and 4,549,958. However, there is an ever present need to develop new, more effectives and/or efficient catalyst reactivation and metals passivation processes.

SUMMARY OF THE INVENTION

It is an object of this invention to provide a multi-step process for treating a spent, metal-contaminated zeolite-containing cracking catalyst composition, under such conditions as to enhance its catalytic cracking activity and to reduce its capability of generating hydrogen during catalytic cracking. It is another object of this invention to provide a reactivated spent catalyst composition. It is still another object of this invention to provide a catalytic cracking process employing a reactivated spent cracking catalyst composition. Other objects and advantages will become apparent from the detailed description of the invention and the appended claims.

In accordance with this invention, a process for reactivating a spent cracking catalyst composition comprises the step of:

contacting a spent zeolite-containing catalytic cracking catalyst composition, which contains at least one metal contaminant and at least a portion of which has previously been used in a catalytic cracking process (and has thereby lost some of its initial catalytic cracking activity, i.e., its cracking activity before its use in the catalytic cracking process), substantially simultaneously with (a) at least one fluorine compound selected from the group consisting of $NH_4F$, $NH_4HF_2$ and HF and (b) a metals passivating agent selected from the group consisting of compounds of an alkaline earth metal (Be, Mg, Ca, Sr, Ba), antimony, and mixtures of these compounds, under such contacting conditions as to reduce the detrimental effect of said at least one metal contaminant contained in the spent cracking catalyst composition during catalytic cracking, as measured by hydrogen generation in a test for catalytically cracking a heavy hydrocarbon-containing oil, carried out substantially in accordance with the procedure of Example II of U.S. Pat. No. 4,794,095, the disclosure of which is herein incorporated by reference.

In a preferred embodiment, the fluorine compound is ammonium fluoride, more preferably dissolved in water. In another preferred embodiment, the passivating agent in step (d) is selected from among compounds of Sb and Ca.

Also in accordance with this invention, a reactivated spent catalyst having been prepared by the above-described reactivation process (comprising substantially simultaneous contacting with at least one fluorine compound and at least one passivating agent) it provided.

Further in accordance with this invention, a catalytic cracking process is provided comprising the step of contacting a hydrocarbon containing feed stream with a zeolite-containing cracking catalyst composition, under such cracking conditions as to obtain at least one normally liquid (i.e., liquid at 25° and 1 atm.) hydrocarbon containing product stream having a lower initial boiling point and higher API gravity than said hydrocarbon-containing feed stream, wherein at least a portion of said zeolite-containing cracking catalyst composition is a reactivated spent catalyst composition having been substantially simultaneously contacted with a suitable fluorine compound and at least one passivating agent, as described above.

DETAILED DESCRIPTION OF THE INVENTION

The term "catalytic cracking process", as used herein, implies that essentially no hydrocracking occurs and that the catalytic cracking process is carried out with a hydrocarbon-containing oil, substantially in the absence of added hydrogen gas. The term "spent", as used herein, implies that at least a portion of the zeolite-containing catalyst composition employed in step (a) has been used in process for catalytically cracking hydrocarbon-containing oils, in particular those containing metal (Ni, V, Cu) impurities, and has then been regenerated by stripping of adhered oil from the catalyst (such as by steam-stripping) and subsequent heating in an oxidizing gas atmosphere (such as air) so as to burn off coke deposits on the catalyst composition. The term "reactivating", as used herein, implies that the extent of hydrogen generation (during catalytic cracking) caused by metal deposites on a spent cracking catalyst is reduced. Additional benefits (such as higher feed conversion, higher gasoline yield) may also be attained by the reactivating treatment of the spent catalyst.

Any spent zeolite-containing catalyst composition, which contains at least one metal contaminant and at least a portion of which has previously been used in a catalytic cracking process, can be used as starting material i the reactivation process of this invention. The spent catalyst composition can contain any portion of such regenerated catalyst composition, ranging from 100% to about 10 weight-% (i.e., containing 0% to about 90 weight-% fresh, unused zeolite-containing cracking catalyst composition). The term "spent catalyst composition", as used herein, encompasses equilibrium cracking catalysts, which are commonly employed in commercial cracking operations and generally comprise a physical blend of regenerated used catalyst composition and fresh (unused) cracking catalyst composition. An equilibrium catalyst generally comprises a mixture of catalyst particles of various ages, i.e., a portion of the equilibrium catalyst particles has passed through a varying number of cracking and regeneration cycles, while a small portion of the equilibrium catalyst particles is fresh (unused) cracking catalyst composition.

The zeolite component of the spent zeolite-containing cracking composition of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and the like, and mixtures thereof. Additional examples of suitable zeolites are listed in U.S. Pat. No. 4,158,621, the disclosure of which is herein incorporated by reference. The term "zeolite", as used herein, includes zeolites which have been pretreated, such as those from which a portion of Al has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromia silicates, ferrosilicates, borosilicates, and the like, as disclosed in U.S. Pat. No. 4,556,749, the disclosure of which is herein incorporated by reference.

Generally the zeolite component of the spent cracking catalyst composition is dispersed in a suitable solid refractory inorganic matrix material, such as alumina, silica, silica-alumina (presently preferred), aluminum phosphate, magnesium oxide, mixtures of two or more of the above-listed materials, and the like. The preparation of such zeolite/matrix cracking catalyst compositions is well known and is not a critical feature of this invention. Generally, the surface area (measured by nitrogen adsorption, substantially in accordance with the BET method of Brunauer, Emmett and Teller) of the spent zeolite/matrix cracking catalyst composition used in step (a) is in the range of from about 100 to about 800 $m^2/g$. Generally, the weight ratio of zeolite to matrix material in the spent cracking catalyst composition is in the range of from about 1:20 to about 1:1.

The spent zeolite-containing cracking catalyst composition employed in the process of the invention contains metal compounds as contaminants (generally as oxide), such as compounds (particularly oxides) of Ni, V, Fe, and Cu, and the like. Contaminants of each metal can be present in amounts ranging from traces (about 0.1 weight-%) to about 2.0 weight-% of contaminant of each metal, expressed as metal oxide. These impurities in the spent cracking catalyst compositions have generally been absorbed from the oil feed in a previous cracking process. However, the origin of these metal impurities is not believed to be a critical feature of this invention.

Fluorine compounds which can be employed in the reactivation process of this invention are $NH_4F$ (preferred), $NH_4HF_2$, HF, and mixtures of two or more of these compounds. The fluorine compound can be a gas or a liquid or a solid. Preferably, the fluorine compound is an inorganic fluoride, more preferably $NH_4F$, most preferably dissolved in water.

The term "metals passivating", as used herein, implies that the detrimental effect of generating $H_2$ during catalytic cracking caused by metal deposits on a cracking composition has been mitigated. Any suitable metals passivating agent selected from the group consisting of compounds of Be, Mg, Ca, Sr, Ba, Sb, and mixtures thereof can be used in the reactivation process of this invention. Non-limiting examples of such compounds are described in U.S. Pat. Nos. 3,711,422, 4,025,458, 4,321,128, 4,337,144, 4,473,463, and 4,728,629, the disclosures of which are incorporated herein by reference.

Preferred passivating agents include: antimony tris(0,0-dihydrocarbyl) phosphorodithioates, antimony oxides ($Sb_2O_3$, $Sb_2O_5$), antimony carboxylates, antimony mercaptides, compounds of calcium, such as Ca nitrate, Ca carboxylates, and the like.

The substantially simultaneous contacting of the spent, metal-contaminated zeolite-containing cracking catalyst with the fluorine compound(s) and the metal passivating agent(s) can be carried out in any suitable manner. In one mode of operation, the spent cracking catalyst is contacted (either by impregnation or by spraying or the like) with a solution which contains both the fluorine compound(s) and the metals passivating agent(s). This mode is feasible if the fluorine compound and the metals passivating agent do not react with one another and do not from a precipitate.

In another mode of operation, a first solution containing at least one fluorine compound and a second solution containing at least one metal passivating agent are prepared. Then the spent catalyst composition is contacted with the first solution and immediately thereafter with the second solution (either by impregnation or by spraying). Or the spent catalyst is contacted with the second solution and immediately thereafter with the first solution (either by impregnation or by spraying). Or the spent catalyst is simultaneously sprayed with the first solution and the second solution.

The contacting process can be carried out either as a batch process or as a continuous process. Any suitable time of contact of the spent cracking catalyst composition with the first and the second solutions can be employed, generally about 0.1 to about 10 hours, Any suitable temperature can be employed in the contacting process, generally about 10° to about 100° C. It is generally preferable to carry out some agitation (e.g., stirring or tumbling or falling of the spent catalyst particles) during the contacting step.

Any suitable solvent for the fluorine compound(s) and for the metals passivating agent(s) can be employed, such as water, alcohols (such as methanol, ethanol, etc.) esters (such as ethyl acetate), ketones (such as acetone), liquid hydrocarbons (such as hexane, heptane, cyclohexane, benzene, toluene and the like). The choice of the solvent(s) will be determined by the chemical nature of fluorine compound(s) and of the metals passivating agent(s), and can easily be made by those having ordinary skill in the art. Any suitable concentration of the fluorine compound(s) in a solution can be employed, preferably about 0.01 to about 2 mol/l (more preferably about 0.1–1 mol/l). Any suitable concentration of the metals passivating agent(s) in a liquid medium, preferably a solution, can be employed, preferably about 0.01–0.5 mol/l (more preferably about 0.1 to 0.3 mol/l). It is within the scope of this invention to use a colloidal dispersion of the passivating agent in a liquid medium (e.g., in water).

Any suitable weight ratio of the contacting solution(s) to the spent zeolite-containing cracking catalyst can be employed in the reactivation process of this invention. Generally, these weight ratios are selected such that the ratio of the number of millimoles of the fluorine compound(s) to the number of grams of the spent cracking catalyst composition is in the range of from about 0.01:1 to about 10:1 (preferably about 0.2:1 to about 1:1), and the ratio of the number of grams of metals passivating agent(s) to the number of grams of spent catalyst composition is in the range of from about 0.001:1 to about 0.5:1 (preferably about 0.002:1 to about 0.2:1). Preferably, the concentration of the metals passivating agent in solution and the ratio of solution to spent catalyst are chosen such that about 0.01 to about 5, more prferably about 0.01-2, weight-% of metals passivating element (i.e., Sb, Ca, etc. and mixtures thereof) is incorporated into the spent cracking catalyst.

Preferably, the spent cracking catalyst is heated after the contacting with the fluorine compound(s) and the metals passivating agent(s). Any suitable heating conditions can be employed which are effective to substantially dry the spent catalyst which has been treated with the fluorine compound(s) and metals passivating agent(s). Preferably, the treated spent catalyst is first heated at a relatively low temperature (more preferably at about 80°-200° C.) for a time long enough (more preferably at about 0.5-10 hours) to substantially dry the treated spent catalyst. Preferably, the obtained substantially dried catalyst material is then heated at a higher temperature (more preferably at about 300°-500° C. for hours 0.5-10 hours), primarily for the purpose of decomposing the metals passivating agent(s) to oxides of the metal passivating element(s), such as oxides of Sb, Ca and the like. The above heating steps can be carried out in an oxidizing gas, such as air, or in an inert gas atmosphere (e.g., in a stream of $N_2$ or Ar or He).

The reactivated catalyst composition which is obtained in the reactivation process of this invention can be used in any catalytic cracking process, i.e., a process for catalytically cracking hydrocarbon-containing oil feedstocks, in any suitable cracking reactor (e.g. in a FCC reactor or in a Thermofor moving bed reactor), essentially in the absence of added hydrogen gas. The reactivated catalyst composition can be used alone or in admixture with fresh (unused) zeolite-containing catalyst composition in catalytic cracking processes.

The hydrocarbon-containing feed stream for the catalytic cracking process of this invention can be any suitable feedstock. Generally the feed has an initial boiling point (ASTM D 1160) in excess of about 400° F., preferably a boiling range of from about 400° to about 1200° F., more preferably a range of from about 500° to about 1100° F., measured at atmospheric pressure conditions. The API gravity (measured at 60° F.) generally is in the range of from about 5 to about 40, preferably from about 10 to about 35. Frequently these feedstocks contain Ramsbottom carbon residue (ASTM D524; generally about 0.1-20 weight-%), sulfur (generally about 0.1-5 weight-% S), nitrogen (generally about 0.5-2 weight-% N), nickel (generally about 0.05-30 ppm Ni, i.e., parts by weight of Ni per million parts of feed), vanadium (generally about 0.1-50 ppm V) and copper (generally about 0.1-30 ppm Cu). Non-limiting examples of suitable feedstocks are light gas oils, heavy gas oils, vacuum oils, cracker recycle oils (cycle oils), residua (such as distillation bottoms fractions), hydrotreated residua (e.g., hydrotreated in the presence of Ni, Co, Mo-promoted alumina catalyst(s), liquid coal pyrolyzates, liquid products from extraction or pyrolysis of tar sand, shale oils, heavy fractions of shale oils, and the like. The presently most preferably feedstocks are heavy gas oils and hydrotreated residua.

Any suitable reactor can be used for the catalytic cracking process of this invention. Generally, a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116. Generally, a catalyst regeneration unit (for removal of coke deposits) is combined with the FCC cracking unit, as is shown in the above-cited patents.

Specific operating conditions of the cracking operation depend greatly on the type of feed, the type and dimensions of the cracking reactor and the oil feed rate. Examples of operating conditions are described in the above-cited patents and in many publications. In an FCC operation, generally the weight ratio of catalyst composition to oil feed (i.e., hydrocarbon-containing feed) ranges from about 2:1 to about 10:1, the contact time between oil feed and catalyst is in the range of from about 0.2 to about 2.0 seconds, and the cracking temperature is in the range of from about 800° to about 1200° F. Generally, steam is added with the oil feed to the FCC reactor so as to aid in the dispersion of the oil as droplets. Generally, the weight ratio of steam to oil feed is in the range of from about 0.05:1 to about 0.5:1.

The separation of spent (i.e., used) cracking catalyst from gaseous and liquid cracked products and the separation of cracking products into various gaseous and liquid product fractions can be carried out by any conventional separation means. The most desirable product fraction is gasoline (ASTM boiling range: about 180°-400° F.). Non-limiting examples of such separation schemes are shown in "Petroleum Refining" by James H. Gary and Glenn E. Handwerk, Marcel Dekker, Inc., 1975.

Generally, cracking catalysts are regenerated, preferably by steam stripping for removal of adhered oil and subsequent heating under oxidizing conditions so as to burn off carbon deposits. At least a portion of the regenerated cracking catalyst composition can then be treated by the reactivation process of this invention and therafter be recycled to the catalytic cracking reactor, generally in admixture with fresh (unused) cracking catalyst.

The following examples are present to further illustrate this invention and are not to be considered as unduly limiting the scope of this invention.

EXAMPLE 1

This example illustrates the reactivation of a metal-contaminated zeolite-containing equilibrium catalyst, i.e., a catalytic cracking catalyst a portion of which had previously been employed in a catalytic cracking process and had then been regenerated.

Catalyst A (Control) was a GXO-40 equilibrium catalyst, which had been supplied as fresh catalyst by Davison Chemical Division of W. R. Grace and Company, Baltimore, Md., and had previously been employed in a commercial FCC cracking process in a refinery of Phillips Petroleum Company and thereafter had been regenerated by heating in air. The fresh catalyst contained about 25 weight-% zeolite and about 75 weight-% silica-alumina matrix. Catalyst A contained about 0.24 weight-% Ni, about 0.34 weight-% V, about 0.61 weight-% Fe, about 0.01 weight-% Cu, 0.05-0.15 weight-% Sb, and about 0.36 weight-% Na. Catalyst A had a surface area of 113 m$^2$/g, a total pore volume of 0.23 cc/g, an apparent bulk density of 0.89 g/cc, and a zeolite unit cell size of 24.39 Å.

Catalyst B (Control) was prepared by pouring a solution of 0.36 grams Vanlube 672 (provided by R. T. Vanderbilt Company; Norwalk, Conn.; containing Sb tris(0,0-dipropyl) phosphordithioate at a concentration of 10.7 weight-% Sb) in 50 cc toluene over 33.5 grams of Catalyst A. The mixture of the antimony solution and Catalyst A was stirred and heated to dryness. The dried material was placed into a quartz reactor and heated in a stream of nitrogen at a temperature which was gradually raised from 400° F. (initial) to 1200° F. (final) within one hour. The catalyst material was then calcined for 1 hour in air at 1250° F.

Catalyst C (Control) was prepared by impregnating 100 grams of Catalyst A with a solution of 3.8 grams of NH$_4$F in 100 cc water and dried in air for 2 hours at 120° C.

Catalyst D (Invention) was prepared by pouring first a solution of 1.9 grams of NH$_4$F in 24 cc water and immediately thereafter a mixture of 0.288 grams of Phil-AD CA 6000 (an aqueous dispersion of Sb$_2$O$_5$, containing about 20 weight-% Sb; provided by Catalyst Resources, Inc.; Pasadena, Tex.) and 24 cc water over Catalyst A. The entire mixture of Catalyst A, NH$_4$F solution and antimony dispersion was stirred and heated to dryness in air at 120° C.

Catalysts A through D were then evaluated in a MCBU (micro-confined bed unit) cracking test reactor, substantially in accordance with the procedure of Example II of U.S. Pat. No. 4,794,095. Cracking test conditions comprised a temperature of about 950° F., a catalyst to oil weight ratio of 6:1, and the use of a hydrotreated residuum as oil feed having API gravity at 60° C. of 18.7, sulfur content of 0.53 weight-%, basic nitrogen content of 0.09 weight-%, Conradson carbon content of 6.7 weight-%, nickel content of 10.6 ppm (parts per million by weight) and vanadium content of 12.7 ppm. Test results are summarized in Table I.

(Catalyst D), unexpectedly, was higher than the cumulative reduction in H$_2$ generation caused by treatment with Sb alone (Catalyst B) and with NH$_4$F along (Catalyst C).

EXAMPLE II

This example provides additional test results on the reactivation of a metal-contaminated equilibrium cracking catalyst.

Catalyst F (Control) was a copper contaminated equilibrium cracking catalyst, similar to Catalyst A but containing more Cu than Catalyst A. Catalyst F contained 320 ppm Cu.

Catalyst G (Control) was similar to Catalyst C (Example I) but contained more Cu. The NH$_4$F-treated Catalyst F contained 5000 ppm F.

Catalyst H (Control) was similar to Catalyst B but contained more Cu. The Sb$_2$O$_2$-treated Catalyst F (treated with Phil-Ad CA 6000; see Example I) contained 740 ppm Sb.

Catalyst I (Invention) was similar to Catalyst D (see Example I) but contained more Cu. It contained 5000 ppm F and 740 ppm Sb.

Catalyst J (Control) was SbF$_3$-treated Catalyst F (rather than NH$_4$F/Sb$_2$O$_5$-treated Catalyst F). Catalyst J contained 740 ppm Sb (as SbF$_3$).

Catalyst K (Control) was a calcium-treated Catalyst F, and was prepared by stirring Catalyst F with an aqueous solution of Ca(NO$_3$)$_2$·4H$_2$O, followed by heating to dryness. Catalyst K contained 238 ppm Ca.

Catalyst L (Invention) was prepared by stirring Catalyst F with an aqueous solution of NH$_4$F and immedi-

TABLE I

| Run | Catalyst | Catalyst Treatment | Conversion (Wt % of Feed) | Gasoline Yield (Wt % of Converted Feed) | H$_2$ Generation (SCF/BL Converted Feed) |
|---|---|---|---|---|---|
| 1 | A | None | 73 | 50 | 378 |
| 2 | " | " | 73 | 49 | 359 |
| 3 | " | " | 74 | 51 | 370 |
| 4 | " | " | 72 | 50 | 363 |
| | | Average: | 73 | 50 | 368 |
| 5 | B | + Sb | 74 | 50 | 334 |
| 6 | " | " | 74 | 50 | 322 |
| 7 | " | " | 72 | 49 | 325 |
| 8 | " | " | 72 | 48 | 311 |
| | | Average: | 73 | 49 | 323  −12%[1] |
| 9 | C | + NH$_4$F | 73 | 50 | 233 |
| 10 | " | " | 72 | 50 | 271 |
| 11 | " | " | 70 | 48 | 237  −33%[1] |
| | | Average: | 72 | 49 | 247 |
| 12 | D | + Sb + NH$_4$F | 76 | 50 | 150 |
| 13 | " | " | 73 | 50 | 197 |
| 14 | " | " | 72 | 50 | 216 |
| | | Average: | 74 | 50 | 188  −49%[1] |

[1] reduction in H$_2$ generation in comparison with untreated Catalyst A.

Test results in Table I show that the amount of hydrogen generated by the metal-contaminated equilibrium cracking catalyst was lowest when it had been treated simultaneously with an antimony compound and ammonium fluoride. Furthermore, the reduction in H$_2$ generation caused by treatment with Sb and NH$_4$F ately thereafter with an aqueous solution of Ca(NO$_3$)$_2$·4H$_2$O, followed by heating to dryness. Catalyst L contained 238 ppm Ca and 5000 ppm F.

Catalysts F through L were evaluated in a MCBU cracking test reactor at the conditions described in Example I. Test results are summarized in Table II.

TABLE II

| Run | Catalyst | Catalyst Treatment | Conversion (Wt % of Feed) | Gasoline Yield (Wt % of Converted Feed) | H$_2$ Generation (SCF/BL Converted Feed) |
|---|---|---|---|---|---|
| 15 | F | None | 76.6 | 49.9 | 338 |
| 16 | " | " | 75.7 | 50.4 | 339 |
| 17 | " | " | 78.5 | 51.0 | 299 |
| 18 | " | " | 76.1 | 49.5 | 304 |

TABLE II-continued

| Run | Catalyst | Catalyst Treatment | Conversion (Wt % of Feed) | Gasoline Yield (Wt % of Converted Feed) | H₂ Generation (SCF/BL Converted Feed) |
|---|---|---|---|---|---|
|  |  | Average: | 76.7 | 50.2 | 320 |
| 19 | G | + NH₄F | 80.8 | 51.7 | 263 |
| 20 | " | " | 80.7 | 49.5 | 314 |
| 21 | " | " | 80.4 | 50.9 | 270 |
|  |  | Average: | 80.6 | 50.7 | 282 |
| 22 | H | + Sb | 77.9 | 50.4 | 292 |
| 23 | " | " | 75.8 | 49.6 | 328 |
| 24 | " | " | 76.7 | 49.5 | 342 |
| 25 | " | " | 77.0 | 48.5 | 335 |
|  |  | Average: | 76.9 | 49.5 | 324 |
| 26 | I | + Sb + NH₄F | 81.5 | 50.3 | 241 |
| 27 | " | " | 80.8 | 51.3 | 278 |
| 28 | " | " | 79.4 | 51.1 | 252 |
|  |  | Average: | 80.6 | 50.9 | 257 |
| 29 | J | + SbF₃ | 77.8 | 49.8 | 312 |
| 30 | K | + Ca | 78.4 | 50.3 | 300 |
| 31 | " | " | 77.0 | 49.3 | 348 |
| 32 | " | " | 77.0 | 49.3 | 341 |
|  |  | Average: | 77.5 | 49.6 | 330 |
| 33 | L | + Ca + NH₄F | 80.6 | 51.2 | 250 |
| 34 | " | " | 80.9 | 52.0 | 257 |
| 35 | " | " | 80.1 | 50.5 | 275 |
|  |  | Average: | 80.5 | 51.2 | 261 |

Test results listed in Table II show that treatment of a copper-contaminated equilibrium cracking catalyst with an antimony or a calcium compound alone had no beneficial effect on hydrogen generation (compare runs 15–18 with runs 22–25 and with runs 30–32). It is thus most surprising that the combination of NH₄F with the antimony compound and the combination of NH₄F with the calcium compound were more effective in reducing hydrogen generation than treatment with NH₄F alone (compare runs 19–21 with runs 26–28 and runs 33–35). Furthermore, the combination of antimony compound and NH₄F was much more effective in suppressing H₂ generation than SbF₃ (compare runs 26–28 with run 29).

Reasonable variations, modifications and adaptions for various conditions and uses can be made within the scope of the disclosure and appended claims.

What is claimed is:

1. A process for reactivating a spent cracking catalyst composition comprising the step of
   contacting a spent zeolite-containing catalytic cracking catalyst composition which contains at least one metal contaminant substantially simultaneously with (a) at least one fluorine compound selected from the group consisting of NH₄F, NH₄HF₂ and HF and (b) a metals passivating agent selected from the group consisting of compounds of beryllium, magnesium, calcium, strontium, barium, antimony, and mixtures of said compounds,
   under such contacting conditions as to reduce hdyrogen generation caused by said at least one metal contaminant contained in said spent zeolite-containing cracking catalyst during catalyst cracking.

2. A process in accordance with claim 1, wherein said at least one metal contaminant in said spent cracking catalyst composition is selected from the group consisting of compounds of nickel, vanadium, iron and copper.

3. A process in accordance with claim 2, wherein the level of said at least one metal contaminant in said spent cracking catalyst composition is in the range of from about 0.01 to about 2.0 weight-% of each contaminant metal, expressed as metal oxide.

4. A process in accordance with claim 1, wherein said at least one fluorine compound is NH₄F.

5. A process in accordance with claim 4, wherein NH₄F is dissolved in water so ss to form an aqueous solution.

6. A process in accordance with claim 5, wherein the concentration of NH₄F in said aqueous solution is about 0.01–2 mol/l.

7. A process in accordance with claim 1, wherein said metals passivating agent is at least one compound of antimony.

8. A process in accordance with claim 1, wherein said metals passivating agent is at least one compound of calcium.

9. A process in accordance with claim 1, wherein said at least one passivating agent is selected from the group consisting of compounds of calcium and antimony, and is dissolved, or, alternatively, colloidally dispersed in a liquid medium and is present in said liquid medium at a concentration of about 0.01–0.5 mol/l.

10. A process in accordance with claim 1, wherein the ratio of the number of millimoles of said fluorine compound to the number of grams of said spent cracking catalyst is in the range of from about 0.01:1 to about 10:1.

11. A process in accordance with claim 10 wherein said fluorine compound is NH₄F.

12. A process in accordance with claim 1, wherein the weight ratio of said passivating agent to said spent cracking catalyst composition is in the range of from about 0.001:1 to about 0.5:1.

13. A process in accordance with claim 12, wherein said passivating agent is selected from the group consisting of compounds of calcium and antimony.

14. A process in accordance with claim 13, wherein said flourine compound is NH₄F, and said passivating agent is selected from the group consisting of Sb₂O₃, Sb₂O₅, Sb tris(0,0-dihydrocarbyl) phorphordithioates and Ca(NO₃)₂.

15. A process in accordance with claim 1 additionally comprising the step of substantially drying said spent cracking catalyst composition after said contacting step.

16. A process in accordance with claim 15 comprising the additional step of heating the spent catalyst composition, which has undergone said contacting and drying steps, at about 300°-500° C. for about 0.5-10 hours.

17. A cracking process comprising the step of contacting a hydrocarbon-containing feed stream with a zeolite-containing cracking catalyst composition, under such cracking conditions as to obtain at least one normally liquid hydrocarbon-containing product stream having a lower initial boiling point and higher API gravity than said hydrocarbon-containing feed stream; wherein at least a portion of said cracking catalyst composition is a reactivated spent catalyst composition having undergone a reactivation process comprising the step of contacting a spent zeolite-containing catalytic cracking catalyst composition which contains at least one metal contaminant substantially simultaneously with (a) at least one fluorine compound selected from the group consisting of $NH_4F$, $NH_4HF_2$ and HF and (b) a metals passivating agent selected from the group consisting of compounds of beryllium, magnesium, calcium, strontium, barium, antimony, and mixtures of said compounds, under such contacting conditions as to reduce hydrogen generation caused by said at least one metal contaminant contained in said spent zeolite-containing cracking catalyst during catalyst cracking.

18. A process in accordance with claim 17, wherien said at least one metal contaminant in said spent cracking catalyst composition is selected from the group consisting of compounds of nickel, vanadium, iron and copper.

19. A process in accordance with claim 18, wherein the level of said at least one metal contaminant in said spent cracking catalyst composition is in the range of from about 0.01 to about 2.0 weight-% of each contaminant metal, expressed as metal oxide.

20. A process in accordance with claim 17, wherein said at least one fluorine compound is $NH_4F$.

21. A process with claim 17, wherein $NH_4F$ is dissolved in water so as to form an aqueous solution.

22. A process in accordance with claim 21, wherein the concentration of $NH_4F$ in said aqueous solution is about 0.01-2 mol/l.

23. A process in accordance with claim 17, wherein said metals passivating agent is at least one compound of antimony.

24. A process in accordance with claim 17, wherein said metals passivating agent is at least one compound of calcium.

25. A process in accordance with claim 17, wherein said at least one passivating agent is selected from the group consisting of compounds of calcium and antimony, and is dissolved, or, alternatively, colloidally dispersed in a liquid medium and is present in said liquid medium at a concentration of about 0.01-0.5 mol/l.

26. A process in accordance with claim 17, wherein the ratio of the number of millimoles of said fluorine compound to the number of grams of said spent cracking catalyst is in the range of from about 0.01:1 to about 10:1.

27. A process in accordance with claim 26, wherein said fluorine compound is $NH_4F$.

28. A process in accordance with claim 17, wherein the weight ratio of said passivating agent to said spent cracking catalyst composition is in the range of from about 0.001 to about 0.5:1.

29. A process in accordance with claim 28, wherein said passivating agent is selected from the group consisting of compounds of calcium and antimony.

30. A process in accordance with claim 29, wherein said fluorine compound is $NH_4F$, and said passivating agent is selected from the group consisting of $Sb_2O_3$, $Sb_2O_5$, tris(0,0-dihydrocarbyl) phorphordithioates and $Ca(NO_3)_2$.

31. A process in accordance with claim 17 additionally comprising the step of substantially drying said spent cracking catalyst composition after said contacting step.

32. A process in accordance with claim 31 comprising the additional step of heating the spent catalyst composition which has under gone said contacting and drying steps, at about 300°-500° C. for about 0.5-10 hours.

33. A cracking process in accordance with claim 17, wherein said hydrocarbon-containing feed stream has an initial boiling point, determined in accordance with ASTM method D 1160, of at least 400° F., measured at atmospheric pressure conditions, and an API gravity in the range of from about 5 to about 40.

34. A cracking process in accordance with claim 33, wherein said hydrocarbon-containing feed stream has a boiling range of from about 500° F. to about 1110° F. and an API gravity in the range of from about 10 to about 35.

35. A cracking process in accordance with claim 17, wherein said hydrocarbon-containing feed stream contains about 0.1-20 weight-% Ramsbottom carbon residue, about 0.1-5 weight-% sulfur, about 0.05-2.0 weight-% nitrogen, about 0.05-30 ppm nickel, about 0.1-50 ppm vanadium and about 0.01-30 ppm copper.

36. A cracking process in accordance with claim 17, wherein said hydrocarbon-containing feed stream is selected from the group consisting of heavy gas oils and hydrotreated residue.

37. A cracking process in accordance with claim 17, wherein said cracking conditions comprise a temperature in the range of from about 800° to about 1200° F., and a weight ratio of said catalyst composition to said hydrocarbon-containing feed in the range of from about 2:1 to about 10:1.

38. A cracking process in accordance with claim 17, wherein steam is present at a weight ratio of steam of said hydrocarbon-containing feed stream in the range of from about 0.05:1 to about 0.5:1.

39. A cracking process in accordance with claim 17 comprising the additional steps of separating used cracking catalyst composition from gaseous and liquid cracked products, steam-stripping the thus separated used cracking catalyst composition, and heating the steam-stripped cracking catalyst composition under oxidizing conditions so as to burn off coke deposited thereon.

40. A reactivated spent zeolite-containing catalytic cracking catalyst composition produced by the process of claim 1.

* * * * *

UNITED STATES PATENT AND TRADEMARK OFFICE
CERTIFICATE OF CORRECTION

PATENT NO. : 4,935,121

DATED : June 19, 1990

INVENTOR(S) : Chia-Min Fu; Michael K. Maholland; and Richard E. Lowery

It is certified that error appears in the above-identified patent and that said Letters Patent is hereby corrected as shown below:

Claim 1, column 9, line 59, delete "catalyst" and substitute --- catalytic --- therefor.

Claim 5, column 10, line 30, delete "ss" and substitute --- as --- therefor.

Claim 17, column 11, line 28, delete "catalyst" and substitute --- catalytic --- therefor.

Claim 21, column 11, line 41, insert --- in accordance --- before "with".

Claim 38, column 12, line 49, delete "of" after "steam" and substitute --- to --- therefor.

Signed and Sealed this

Twenty-seventh Day of August, 1991

*Attest:*

HARRY F. MANBECK, JR.

*Attesting Officer*  Commissioner of Patents and Trademarks